United States Patent [19]

Schonfeld et al.

[11] Patent Number: 4,745,145

[45] Date of Patent: May 17, 1988

[54] RUBBER COMPOSITIONS AND ARTICLES THEREOF HAVING IMPROVED METAL ADHESION AND METAL ADHESION RETENTION

[75] Inventors: Steven E. Schonfeld, Akron; Frederick J. Ravagnani, Uniontown; Adel F. Halasa, Bath, all of Ohio

[73] Assignee: The Firestone Tire & Rubber Company, Akron, Ohio

[21] Appl. No.: 532,078

[22] Filed: Sep. 14, 1983

[51] Int. Cl.$^4$ ............................ C08J 3/18; C08K 3/30
[52] U.S. Cl. .................................... 524/169; 524/240; 524/258
[58] Field of Search ............... 156/110.1, 124, 910; 152/356, 359; 524/169

[56] References Cited

U.S. PATENT DOCUMENTS

| | | | |
|---|---|---|---|
| 3,993,847 | 11/1976 | Kondo | 428/451 |
| 4,097,423 | 6/1978 | Dieterich | 521/100 |
| 4,203,874 | 5/1980 | Halasa et al. | 260/3 |
| 4,239,663 | 12/1980 | Ravagnani et al. | 260/5 |
| 4,324,281 | 4/1982 | Ravagnani et al. | 152/359 |

*Primary Examiner*—Michael Ball
*Attorney, Agent, or Firm*—Daniel N. Hall

[57] ABSTRACT

Rubber compositions and articles such as tires having improved metal adhesion and metal adhesion retention to brass and brass-plated metallic reinforcement. The improvement comprises admixing from about 0.2 to about 6.0 parts per hundred rubber (phr) of a compound selected from the group consisting of 3-amino-2-carboxy-4-chlorobenzophenone, 3-hydroxy-2-methyldiphenylamine and 5-amino-2-methyl-N-phenylbenzenesulfonamide and mixtures thereof with a vulcanizable rubber composition prior to embedding the metallic reinforcement therein and curing. A method for improving the metal adhesion and metal adhesion retention between a vulcanizable rubber and brass or brass-plated metallic reinforcement includes the step of dispersing from about 0.2 to about 6.0 phr of a compound selected from the group consisting of 3-amino-2-carboxy-4-chlorobenzophenone, 3-hydroxy-2-methyldiphenylamine and 5-amino-2-methyl-N-phenylbenzenesulfonamide and mixtures thereof in a vulcanizable rubber composition prior to curing.

8 Claims, No Drawings

RUBBER COMPOSITIONS AND ARTICLES THEREOF HAVING IMPROVED METAL ADHESION AND METAL ADHESION RETENTION

TECHNICAL FIELD

The present invention is directed toward improving the adhesion and adhesion retention between a rubber composition and metallic reinforcement cord, such as steel wire and cable which is embedded in the rubber stock. Flat sheets or strips of such stocks, reinforced with metal or fibers, are utilized as plies or other components in the manufacture of tires, repair stocks for retreading tires, conveyor belts, hoses and the like and are referred to in the art as rubber skim stocks. Skim refers to a relatively thin layer or coating of the rubber over the reinforcement filaments or cords. Greater thicknesses of rubber are also bonded to metal in other instances such as motor mounts and these would not be termed skim stocks.

In the manufacture of the foregoing rubber articles, particularly steel-belted bias and radial tires, it has become common to reinforce the rubber skim stock material with steel wire or cable. One of the more important uses for a metallic reinforced rubber is as a belt where one or more of these belts are substantially circumferentially oriented beneath the tread stock to maintain the integrity and shape of the tire during inflation and subsequent load. Other areas where metal reinforced rubber skim stock may be utilized is in the body ply, bead or chafer of a tire.

In order for these components to function effectively, it is imperative that adhesion between the rubber and the steel cord be effectively maintained. Because steel is prone to oxidation, which even in minor degree is highly deleterious to the necessary adhesion with the rubber skim stock, and it would be most impractical to incorporate a chemically clean, oxidation-free steel cord in the belt at the time of its manufacture, the steel cord is plated with zinc or brass thereby protecting it from oxidation until it can be used.

While adhesion between zinc or brass-plated steel cord and rubber is generally far greater than that between the latter and oxidized steel, existing data determined from article life as well as modern testing techniques indicates that adhesion obtained between plated steel cord and the elastomer must be increased for improved article life and service. Improved adhesion between the rubber skim stock and brass-plated steel is obtained according to the present invention.

BACKGROUND ART

In order to promote adhesion between rubber and ferrous metals it is known to employ a variety of metallic salts or complexes or other additives as coatings to the metal or as an ingredient in a rubber composition.

Representative of the art which discloses the use of an additive ingredient in the rubber stock are three patents which are commonly owned by the Assignee of record herein. U.S. Pat. No. 4,203,874 is directed toward a rubber composition and tire having improved rubber-to-metal adhesion and a method for improving the adhesion therebetween. All three inventions are based on the addition of a transition metal salt of para-aminobenzoic acid with transition metals such as Ni, Cr, Mn, Zn, Mo, Cd, Zn, Ag and Ti.

U.S. Pat. Nos. 4,239,663 is similar to 4,203,874 wherein para-aminobenzoic acid or the cobalt salt thereof is added to improve rubber-to-metal adhesion.

U.S. Pat. No. 4,324,281 also provides for improved rubber-to-metal adhesion in rubber stocks and tires as well as a method for improving the adhesion. The ingredient added for practice of these inventions is a tetracarboxylic dianhydride, one preferred example being 3,3'-4,4'-benzophenone tetracarboxylic dianhydride.

A fourth U.S. Pat. No. 3,993,847, employs a separate adhesive layer and an ingredient for the rubber compound in a process for laminating rubber to a ferrous metal and the laminated articles resulting therefrom. Improved rubber-to-metal adhesion is obtained by using an adhesive layer comprising an interpolymer of a conjugated diene and a polymerizable heterocyclic nitrogen base and containing silica filler. Adhesion is optionally improved further by the addition of a cobalt compound, e.g., carboxylate, chloride or nitrate. A primary objective of the invention disclosed is that the use of the adhesive layer eliminates the need to employ plated steel.

Thus, while others have sought to enhance adhesion between rubber compositions and metals by employing separate adhesive layers and/or various metal salts, complexes or other ingredients in the stock, the art of which we are aware has not disclosed the exclusive use of the compounds set forth hereinbelow in a vulcanizable rubber stock to increase adhesion properties between rubber and metallic reinforcement, particularly brass-plated steel.

DISCLOSURE OF INVENTION

The present invention provides a vulcanizable rubber composition having improved metal adhesion and metal adhesion retention properties with brass and brass-plated metallic reinforcing elements by incorporating from about 0.2 to about 6.0 parts by weight of a compound selected from the group consisting of 3-amino-2-carboxy-4-chlorobenzophenone, 3-hydroxy-2-methyl-diphenylamine and 5-amino-2- methyl-N-phenylbenzenesulfonamide and mixtures thereof per 100 parts of the rubber component in the rubber composition prior to curing.

The present invention further provides a tire containing a cured rubber composition possessing improved metal adhesion and metal adhesion retention properties with brass-plated steel metallic reinforcing elements embedded therein by incorporating from about 0.2 to about 6.0 parts by weight of a compound selected from the group consisting of 3-amino-2-carboxy-4-chlorobenzophenone, 3-hydroxy-2-methyldiphenylamine and 5-amino-2-methyl-N-phenylbenzenesulforamide and mixtures thereof per 100 parts of the rubber component of the rubber composition prior to curing.

Still further, the present invention provides a method of improving metal adhesion and metal adhesion retention properties between a vulcanizable rubber composition and brass or brass-plated metallic reinforcing elements including the step of dispersing from about 0.2 to about 6.0 parts by weight of a compound selected from the group consisting of 3-amino-2-carboxy-4-chlorobenzophenone, 3-hydroxy-2-methyldiphenylamine and 5-amino-2-methyl-N-phenylbenzenesulfonamide and mixtures thereof per 100 parts of the rubber component in the rubber composition prior to curing.

The metallic reinforcing elements employed in any of the foregoing inventions include solid brass or brass-plated metal. Brass-plated steel cord, monofilament or cable is particularly useful for reinforcing the rubber utilized in various tire ply components. While the rubber stock can also contain conventional components for providing adhesion between the rubber and the metallic reinforcement, the addition of the compounds disclosed herein will improve adhesion further.

PREFERRED MODE FOR CARRYING OUT THE INVENTION

To illustrate our invention, a typical example of a rubber component with embedded metallic reinforcement was chosen. In particular, the example used to demonstrate the invention was a rubber skim stock which is suitable for the preparation of rubber articles such as tires. Adhesion between this stock with brass-plated steel reinforcement subsequent to vulcanization was measured and has also been presented hereinbelow.

The polymer portion of the rubber composition used in the following examples comprised 100 parts by weight of natural rubber. Polymer type, however, is not deemed to be a limitation to the practice of the instant invention. Natural rubber may also be employed in a blended state with synthetic rubbers such as styrene butadiene, synthetic isoprene or other synthetic rubbers. Further, pure forms of synthetic rubbers such as those disclosed may be used either alone or blended with other synthetic rubbers.

The additive component utilized in the practice of the present invention includes 3-amino-2-carboxy-4-chlorobenzophenone, 3-hydroxy-2-methyldiphenylamine and 5-amino-2-methyl-N-phenylbenzenesulfonamide and mixtures thereof. These compounds were obtained from Sandoz Laboratories. Amounts of the compounds employed can range from about 0.2 to about 6.0 parts per hundred parts of rubber (phr) with 2.0 to 4.0 being preferred.

In order to determine improvement in adhesion and adhesion retention obtained when the cobalt compounds of the present invention are added to a rubber composition, T-adhesion tests (rubber-to-steel cord) were conducted according to the procedure which follows.

The test utilized T-adhesion pads prepared by placing 60 gauge slabs of uncured fully compounded rubber skim stock on 51 gauge fabric reinforced rubber backing. Commercial brass-plated steel cables (7/2+1 wire) were placed between two pads of the reinforced rubber skim stock with the wires in contact with the uncured rubber skim at 1.25 cm intervals. The construction of the cables included a core of two wires which were wrapped by seven strands of wire 0.22 mm in diameter which were in turn wrapped by a single strand of wire 0.15 mm in diameter. The width of each adhesion pad was 1.25 cm. The pads were placed in a preheated curing mold and were cured for 30 minutes at 149° C. Rubber-steel cord adhesion testing was done on a Model 1130 Instron Universal Tester at a crosshead speed of 25.4 cm per minute and 110° C. The T-adhesion pads were preheated in the 110° C. oven for 20 minutes prior to testing.

Detailed T-Adhesion Test Procedure

1. Using a Clicker machine and a 15.24 × 1.25 cm die, prepare an adequate number of calendered and control stock samples for T-adhesion pad building.
2. Use one piece of calendered fabric reinforced rubber backing (0.1295 cm).
3. Ply one piece of 60 gauge control rubber skim stock (0.1524 cm) onto the fabric backing.
4. Place sample in building jig with fabric side down.
5. Place ten cords (of brass or zinc coated wire) approximately 17.78 cm in length equally spaced on top of the two piece assembly.
6. Invert another 2 ply assembly, made as in items 1, 2 and 3, on top of cords so that cords are between the 2 layers of rubber skim stock to be tested.
7. This assembly should now fit snugly into the cavity of the curing mold.
8. Adhesion pads shall be cured for 30 minutes at 149° C. and then allowed to equilibrate for 24 hours before testing.
9. Testing Machine: Model 1130 Instron Universal Tester.
10. Test speed 25.4 cm/minute; testing temperature, 110° C. after 20 minutes preheat.
11. The top grip shall be of a special holder made for the cured sample, with a slot in the bottom to permit the sample to be inserted with the wires protruding. The bottom grip should be a wedge type, designed to exert increasing tightening as each wire is pulled from the cured sample.
12. Record 10 wire pull-outs and average. Multiply average pull-out force value by 0.3572 to obtain kilograms per centimeter.

In the tests which follow, a rubber skim stock, composition A, was prepared which did not contain the adhesion promoting ingredients of the present invention. Rubber compositions B, C and D were prepared exactly as was composition A except that they contained 2.0 phr of 3-amino-2-carboxy-4-chlorobenzophenone, 3-hydroxy-2-methyldiphenylamine and 5-amino-2-methyl-N-phenylbenzenesulfonamide, respectively. Thus, the effect of each ingredient is shown for comparison against the control stock. It is to be noted that the control stock already contained certain additives, such as resorcinol and hexamethylene tetramine, for providing adhesion between the rubber and brass-plated steel cord.

The formulation of composition A was as follows with all parts given on the basis of parts per hundred parts of rubber (phr) by weight.

| Compounding Ingredients | Composition A |
| --- | --- |
| Natural Rubber | 100 |
| HAF Black | 50 |
| Zinc Oxide | 7.5 |
| Stearic Acid | 0.5 |
| Santoflex 13[1] | 1.0 |
| Santoflex DD[2] | 2.0 |
| Resorcinol | 2.0 |
| Hexamethylene tetramine | 2.2 |
| Sulfur | 2.8 |
| Oil | 4.7 |
| NOBS Special accelerator[3] | 0.8 |
| Santogard PVI[4] | 0.3 |
| Benzophenone tetracarboxylic dianhydride | 4.0 |

[1] N—(1,3-dimethylbutyl)-N'—phenyl-p-phenylenediamine
[2] 6-dodecyl-1,2-dihydro-2,4,4-trimethylquinoline
[3] N—oxydiethylene benzothiazole-2-sulfenamide (NOBS Special accelerator)
[4] N—(cyclohexylthio)phthalimide It is to be understood that the foregoing composition of the rubber skim stock, composition A, has been presented solely to enable those skilled in the art to have at least one rubber skim stock with which to practice the invention. As such, the present invention is not to be limited only to this specific formulation.

The four compositions were each used to build T-adhesion pads with brass-plated steel cord. As stated hereinabove, the particular steel cord construction employed for this testing has two strands of wire wrapped by seven strands which is in turn wrapped by a single strand. This configuration or style is commonly referred to in the art as 7/2+1 (7 over 2 plus 1) steel cord style. Steel cord style, however, is not a limitation to the present invention and, therefore, other styles of steel cord are applicable. Thus, even single strands of brass-plated steel cord may be employed.

Three sets of tests were conducted on each of the four stocks for comparison. The results of the testing under normal (unaged) conditions and after aging in a humidity chamber at 90 percent relative humidity at 95° F. (30° C.) for 60 to 180 days have been presented in Table I. Humidity chamber aging is significant for determining the chemical stability of chemical bonds formed between the rubber stock and the metallic reinforcement when exposed to conditions of high relative humidity and high temperature, as compared to ambient, and extended periods of time. The force necessary to pull or remove the metallic reinforcement from the vulcanized rubber skim stock is given first, in kg/cm, followed by the percent of rubber skim stock remaining on the surface of the metallic reinforcement. The amount of rubber skim stock remaining on the metallic reinforcement was determined by visual examination and has been reported as % rubber coverage.

TABLE I

| Rubber Composition | Steelcord T-Adhesion Test | | | |
|---|---|---|---|---|
|  | A | B | C | D |
| 3-amino-2-carboxy-4-chlorobenzophenone | — | 2 | — | — |
| 3-hydroxy-2-methyldiphenylamine | — | — | 2 | — |
| 5-amino-2-methyl-N—phenylbenzenesulfonamide | — | — | — | 2 |
| Test A | | | | |
| Normal (Unaged)[a] | | | | |
| Brass-plated cord | | | | |
| Kg/cm | 17.50 | 24.11 | 22.86 | 20.54 |
| % rubber coverage | 90 | 90 | 90 | 90 |
| Test B | | | | |
| 60 Day Humidity Chamber Test[b] | | | | |
| Brass-plated cord | | | | |
| Kg/cm | 16.07 | 22.14 | 18.04 | 18.04 |
| % rubber coverage | 70 | 60 | 80 | 50 |
| Test C | | | | |
| 180 Day Humidity Chamber Test[b] | | | | |
| Brass-plated cord | | | | |
| Kg/cm | 13.93 | 16.61 | 15.54 | 16.43 |
| % rubber coverage | 30 | 60 | 40 | 50 |

[a]T-adhesion pads cured 30 minutes at 149° C. and tested at 110° C.
[b]T-adhesion pads cured 30 minutes at 149° C. humidity aged at 90% relative humidity, 30° C. for increasing periods and tested at 110° C.

As can be determined from Table I, Tests A–C, adhesion of compositions B–D to brass-plated steel cord was significantly better than for composition A during the unaged tests and the long term humidity chamber aging tests. Rubber composition A, which contained none of the additive components of the present invention, showed lower adhesion values in every instance.

The rubber coverage measurement is deemed to be significant in that it visually represents the increased adhesion of the rubber composition to the plated steel cord. As is well known to those skilled in the art, the amount of rubber left adhering to the steel cord after it has been pulled from a cured T-adhesion pad represents the relationship of the adhesive force attaching the rubber composition to the surface of the steel cord and the tensile strength of the rubber composition itself. Large percentages of rubber coverage indicate that the adhesion to the steel cord exceeds the internal strength of the rubber composition itself, i.e., tear strength. Therefore, when the rubber coverage is very high it can be concluded that the metal to rubber adhesion is greater than the force measured to pull the steel cord out of the rubber pad since the force measured was a result of the rubber composition rupturing and not the metal to rubber interface.

Rubber coverage was not lost in the unaged test (A) for any of the compositions. During long term humidity aging, Test B, all four compositions showed reduced coverage. In Test C, after 180 days, compositions B and D showed relatively good coverage compared to composition A wherein only 30 percent rubber coverage was observed.

Based on the foregoing results reported in Table I, we consider the presence of any of the three compounds disclosed herein as well as mixtures thereof in a rubber skim stock to be effective in promoting adhesion between the rubber skim stock and brass-plated steel reinforcement. As stated hereinabove, the rubber can be natural or synthetic or a blend and formulated as a rubber stock or a skim stock.

The present invention also finds utility in, for example, other rubber articles bonded to brass or brass-plated steel such as motor mounts, cutless bearings, torsilastic springs, power belts, printing rolls, metal wire reinforced or braided hose, electrical deicers, shoe heels and wherever it is desired to secure rubber to metal or provide a flexible and strong,k thermally stable bond between the same.

In conclusion, it is to be understood that all methods and rubber compounds disclosed herein fall within the scope of the claimed invention and that the subject invention is not to be limited by the examples set forth herein. As will be apparent to those skilled in the art, the formulation of the rubber composition can be varied within the scope of our total specification disclosure by selection of various amounts of the adhesion-promoting compounds of the present invention and by substitution of various components for any of the other, non-inventive components of the rubber composition as well as the amounts thereof, and it is believed that practice of the present invention can be determined without departing from the spirit of the invention herein disclosed and described, the scope of the invention being limited solely by the scope of the attached claims.

We claim:

1. A vulcanizable rubber composition having improved metal adhesion and metal adhesion retention properties with brass and brass-plated metallic reinforcing elements, the improvement wherein:

from about 0.2 to about 6.0 parts by weight of a compound selected from the group consisting of 3-amino-2-carboxy-4-chlorobenzophenone, 3-hydroxy-2-methyldiphenylamine and 5-amino-2-methyl-N-phenylbenzenesulfonamide and mixtures thereof per 100 parts of the rubber component in said rubber composition is incorporated into said rubber composition prior to curing.

2. A rubber composition as set forth in claim 1, wherein said compound is 3-amino-2-carboxy-4- chlorobenzophenone and is present in an amount of about 2.0 parts per 100 parts of the rubber.

3. A rubber composition as set forth in claim 1, wherein said compound is 3-hydroxy-2-methyldiphenylamine and is present in an amount of about 2.0 parts per 100 parts of the rubber.

4. A rubber composition as set forth in claim 1, wherein said compound is 5-amino-2-methyl-N-phenylbenzenesulfonamide and is present in an amount of about 2.0 parts per 100 parts of the rubber.

5. A method for improving metal adhesion and metal adhesion retention properties between a vulcanizable rubber composition and brass or brass-plated metallic reinforcing elements comprising the step of:

dispersing from about 0.2 to about 6.0 parts by weight of a compound selected from the group consisting of 3-amino-2-carboxy-4-chlorobenzophenone, 3-hydroxy-2-methyldiphenylamine and 5-amino-2-methyl-N-phenylbenzenesulfonamide and mixtures thereof per 100 parts of the rubber component in said rubber composition into said rubber composition prior to curing.

6. A method, as set forth in claim 5, wherein said compound is 3-amino-2-carboxy-4-chlorobenzophenone and is present in an amount of about 2.0 parts per 100 parts of the rubber.

7. A method, as set forth in claim 6, wherein said compound is 3-hydroxy-2-methyldiphenylamine and is present in an amount of about 2.0 parts per 100 parts of the rubber.

8. A method, as set forth in claim 5, wherein said compound is 5-amino-2-methyl-N-phenylbenzenesulfonamide and is present in an amount of about 2.0 parts per 100 parts of the rubber.

* * * * *